United States Patent [19]

Nguyen et al.

[11] Patent Number: 4,694,383
[45] Date of Patent: Sep. 15, 1987

[54] CONTROLLER FOR A RESONANT CONVERTER

[75] Inventors: Vietson M. Nguyen; P. John Dhyanchand, both of Rockford, Ill.

[73] Assignee: Sundstrand Corporation, Rockford, Ill.

[21] Appl. No.: 907,581

[22] Filed: Sep. 15, 1986

[51] Int. Cl.$^4$ .......................................... H02M 3/337
[52] U.S. Cl. ......................................... 363/17; 363/98
[58] Field of Search ..................................... 363/15–17, 363/28, 80, 96, 98

[56] References Cited

U.S. PATENT DOCUMENTS

| | | | |
|---|---|---|---|
| 3,659,184 | 4/1972 | Schwarz | 363/15 |
| 3,953,779 | 4/1976 | Schwarz | 363/28 |
| 4,200,830 | 4/1980 | Oughton et al. | 363/28 |

FOREIGN PATENT DOCUMENTS 855896  8/1981  U.S.S.R. .................... 363/17

OTHER PUBLICATIONS

Kiankhooy-Fard, "Single SCR High Frequency Regulated DC Power Supply", IBM Tech. Discl. Bul., vol. 14, No. 8, pp. 2372, 2373, Jan. 1972.

Primary Examiner—William H. Beha, Jr.
Attorney, Agent, or Firm—Wood, Dalton, Phillips, Mason & Rowe

[57] ABSTRACT

A controller for a resonant DC/DC converter having at least one power switch which is controlled to develop intermediate AC power in a resonant circuit includes means for developing a signal representing the current in the resonant circuit, an integrator having an input coupled to the developing means for integrating the signal developed thereby and a multiplier having a first input coupled to an output of the integrator and further having a second input and an output at which is developed a multiplied signal. A comparator is coupled to the output of the multiplier for comparing the multiplied signal at such output against a reference signal and a frequency-to-voltage converter is coupled between the output of the comparator and a second input of the multiplier for developing a feedback signal which is multiplied by the multiplier with the output of the integrator to derive the multiplied signal. The comparator develops signals which control the switch in the resonant converter so that static and dynamic stability is improved.

18 Claims, 8 Drawing Figures

CASE I
$I_{REF} > I(0+)$

CASE II
$I_{REF} = I(0+)$

CASE III
$I_{REF} < I(0+)$

CONTROLLER FOR A RESONANT CONVERTER

DESCRIPTION

Technical Field

The present invention relates generally to power converters, and more particularly to a control for a resonant DC/DC converter.

Background Art

Resonant converters, and more particularly series-resonant DC/DC converters convert input DC power into intermediate AC power by means of a resonant inverter and rectify and filter the intermediate AC power to produce DC output power. Typically, the inverter has a primary section and a secondary section wherein the primary section includes either two or four power switches which control the flow of current through first and second current conduction paths having a resonant circuit therein including a capacitor, an inductor and a primary winding of a transformer. Schwarz U.S. Pat. No. 3,953,779 discloses a control for such a converter which modulates the output current developed by the converter to maintain the output voltage at a desired value.

It has been found that the Schwarz control results in unstable operation of the converter. More specifically, the differences in the parasitic impedances in the two conduction paths of the inverter results in a difference in the conduction times of the power switches in the paths. This in turn leads to a static instability which is undesirable.

Further, the Schwarz control relies upon the detection of when an integrated error signal reaches a predetermined reference value. If the initial value of the resonant current at the beginning of a conduction interval is close to the reference value, then it may be necessary to detect when the integrated error falls below the reference value, just touches the reference value or rises above the reference value. This necessity to detect various occurrences is difficult to achieve in a practical circuit and results in a dynamic instability which is quite objectionable.

Other types of resonant converter controls have been devised, including the closed-loop frequency controller which accomplishes symmetrical operation of the switches in the conductive power paths and which is primarily utilized for high power applications and the "diode conduction angle" controller. The frequency controller, however, results in a double pole at the frequency $f_r-f_s$ where $f_r$ is the resonant frequency and $f_s$ is the switching frequency. Also, the DC gain of the control to output transfer function of the frequency controller is subject to wild variations when the operating point is changed due to a change in load or control input. This variation renders it difficult to choose the loop gain for the controller. The diode conduction angle controller also suffers from this disadvantage; but in most designs, a bang-bang controller with a slow response integrator is added to the controller to minimize the DC gain variation. Thus, the above-mentioned disadvantages can be eliminated, however, at the cost of very slow response.

DISCLOSURE OF INVENTION

In accordance with the present invention, a controller for a resonant DC/DC converter overcomes the above-noted disadvantages to provide a converter having high static and dynamic stability and fast response.

More specifically, a controller for a resonant DC/DC converter having at least one power switch which is controlled to develop intermediate AC power in a resonant circuit includes first means for developing a signal representing the current in the resonant circuit, an integrator having an input coupled to the developing means for integrating the signal developed thereby and a combining circuit having a first input coupled to an output of the integrator and further having a second input and an output at which is developed a combined signal. A comparator is coupled to the output of the combining circuit for comparing the combined signal against a reference signal and second developing means is coupled between the output of the comparator and a second input of the combining circuit for developing a feedback signal which represents the frequency of the comparator output and which is combined by the combining circuit with the output of the integrator to derive the combined signal. The comparator develops signals which are used to control the switch in the resonant converter so that the dynamic instabilities resulting from use of prior converter controls is avoided.

In a more specific embodiment of the invention, the converter includes at least two switches and preferably two pairs of switches which are alternately operated to cause current conduction in first and second paths. The comparator is coupled to a flip-flop which in turn controls switch drive circuitry to operate the switches in the converter. The present control assures that symmetric operation of the switches is accomplished wherein the conduction times of the switches are equal under steady state operation. This eliminates the static instabilities encountered with the prior Schwarz control.

BEST MODE FOR CARRYING OUT THE INVENTION

Figure 1:
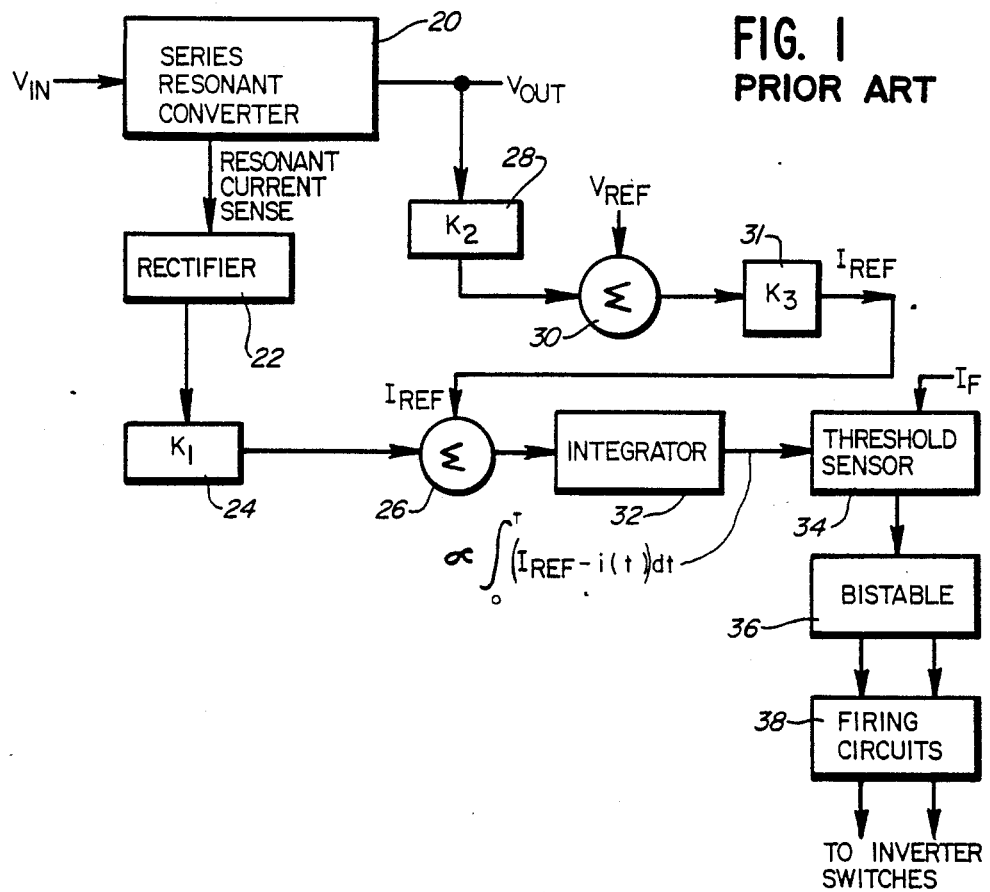
FIG. 1 is a block diagram of a prior art circuit disclosed in the above-identified Schwarz patent.
Figure 2:
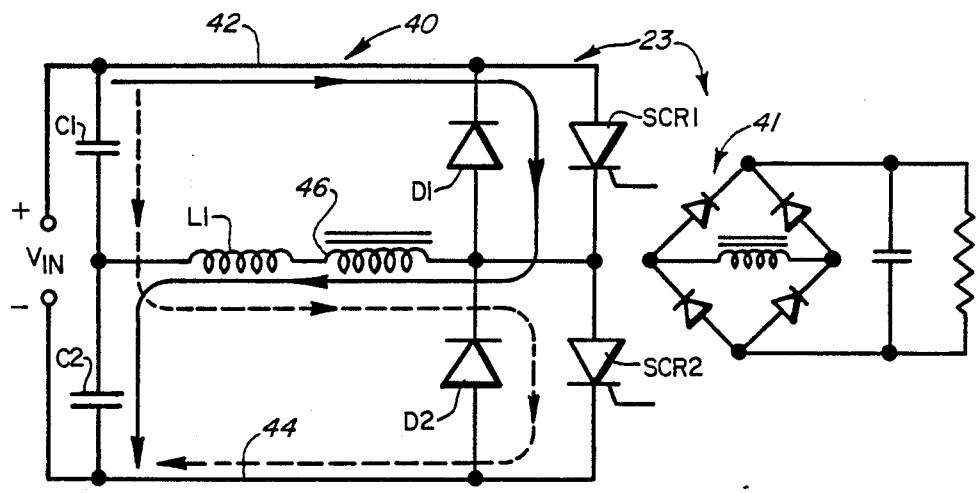
FIG. 2 is a simplified schematic diagram of the inverter contained in the series-resonant inverter shown in block diagram form in FIG. 1.

Referring now to FIG. 1, there is illustrated in block diagram form the control disclosed in the above-referenced Schwarz '779 patent which operates switches in a series-resonant converter 20. The control includes a rectifier 22 which develops a DC signal representing the AC current developed in an inverter stage 23 (shown in FIG. 2) of the converter 20. This signal is attenuated by a scaling circuit 24 and is passed to a first input of a summing junction 26.

A reference signal $I_{REF}$ is derived by a scaling circuit 28 which receives the output voltage $V_{OUT}$ of the converter 20, a summing junction 30 which sums the output of the scaling circuit 28 with a reference voltage $V_{REF}$ and a further scaling circuit 31 coupled to the output of the summing junction 30. The signal $I_{REF}$ is coupled to a second input of the summing junction 26.

The output signal of the summing junction 26 is an error signal which is passed to an integrator 32 that develops a signal proportional to the following quantity:

$$\int_0^T (I_{REF} - i(t))\, dt$$

where i(t) represents the periodic AC current in the inverter stage of the converter 20 and T is the period of such current.

The output of the integrator 32 is passed to a threshold sensor 34 which develops an output pulse when the output of the integrator reaches a predetermined reference level $I_F$. The pulses developed by the threshold sensor 34 are coupled to a bistable multivibrator 36 which develops switch control signals that are coupled to firing circuits 38. The firing circuits in turn control the inverter switches in the series-resonant converter 20.

The Schwarz control often leads to a static instability in the operation of the switches in the inverter of the converter 20. More particularly, and referring also to FIG. 2 which illustrates a primary section and a secondary section 41 of the inverter stage 23, first and second thyristors SCR1 and SCR2 are coupled across first and second power buses 42,44 which in turn receive an input voltage $V_{in}$. Anti-parallel diodes D1,D2 are coupled across the thyristors SCR1,SCR2 to conduct reactive currents. First and second capacitors C1,C2 are coupled across the power buses 42,44 and an inductor L1 and a transformer primary 46 are coupled between the capacitors C1,C2 and the thyristors SCR1,SCR2.

During operation of the inverter primary section 40, the thyristors SCR1,SCR2 are alternately gated into conduction so that, during a first cycle of operation current flows along the solid line path comprising the power bus 42, the thyristor SCR1, the transformer primary 46, the inductor L1 and the capacitor C2 to the power bus 44. In a second cycle of operation, the current through the inductor L1 and the transformer primary 46 is reversed so that conduction takes place along a path represented by the dotted line, i.e. from the power bus 42 through the capacitor C1, the inductor L1, the transformer primary 46 and the thyristor SCR2 to the second power bus 44.

Ideally, the capacitors C1,C2 are of equal capacitance value so that the conduction times of the thyristors SCR,SCR2 should be equal under steady state operating conditions, i.e. when the load is constant. However, there is invariably some difference between the total parasitic impedances in the solid line and dotted line conduction paths. As a result, the magnitude of the integrator output will be greater for one conduction cycle than for the next, in turn leading to asymmetric operation of the thyristors SCR1,SCR2. This static instability is objectionable and should be eliminated, if possible.

Figure 3A:
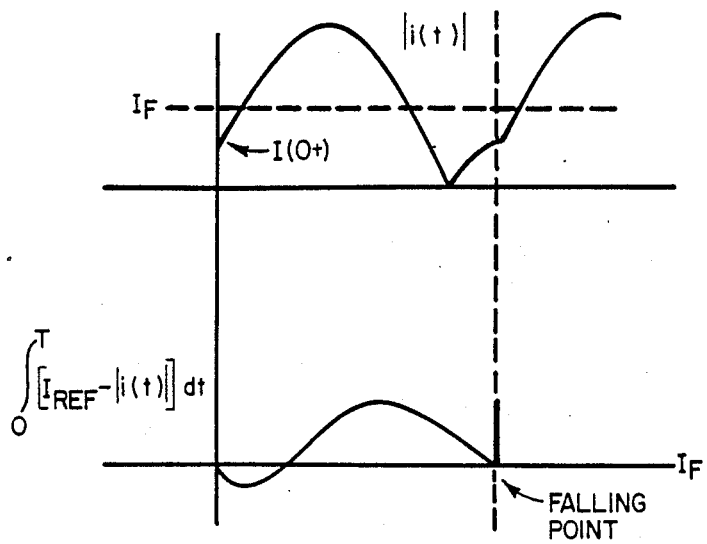
FIGS. 3a–3c comprise a series of waveform diagrams illustrating the operation of the series-resonant converter shown in FIG. 1.
Figure 3B:
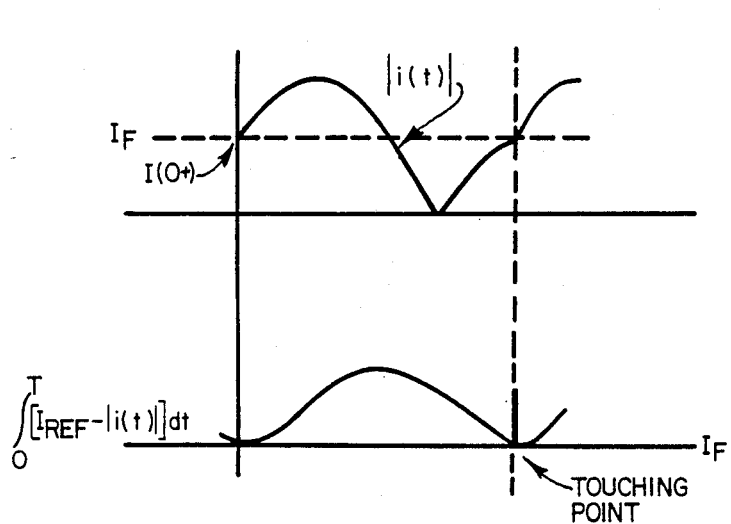
Figure 3C:
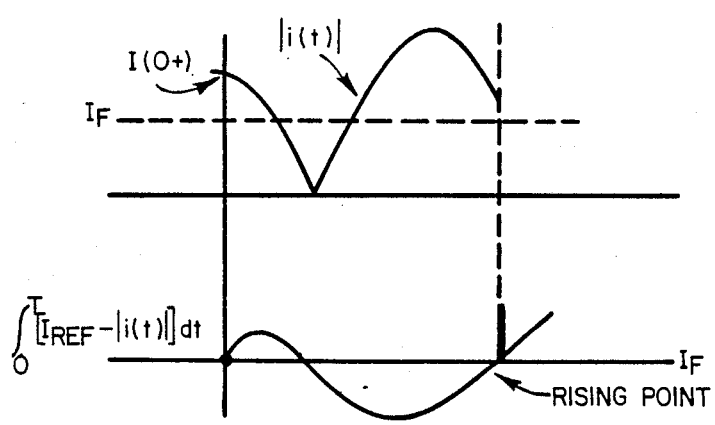

A further difficulty encountered with the use of the control illustrated in FIG. 1 may be understood by reference to the waveform diagrams of FIGS. 3a–3c. This difficulty arises from the fact that the initial value of the resonant current may be less than, equal to or greater than the reference level against which the integrator output is compared. As seen in FIG. 3a, for the case when the signal I(0+) representing the current through the inductor L at the beginning of a conductor cycle is less than the signal $I_F$, it can be seen that the threshold sensor 34 will develop an output pulse when the output of the integrator 32 drops below the level $I_F$.

On the other hand, as seen in FIG. 3b, when the inductor initial current level I(0+) is equal to the reference signal $I_F$, then the threshold sensor 34 will trigger when the output of the integrator 32 just meets or equals the level $I_F$.

As seen in FIG. 3c, when the initial inductor current I(0+) is greater than the signal $I_F$, the threshold sensor 34 develops an output pulse when the output of the integrator 32 rises above the level $I_F$.

As is evident from the foregoing discussion, the threshold sensor 34 must be capable of detecting three different threshold conditions, i.e. when the integrator output drops below a predetermined level, when the integrator output equals the predetermined level and when the integrator output rises above the predetermined level. As a practical matter, the design of such a threshold sensor is problematic at best and typically such a sensor introduces a dynamic instability which is highly objectionable.

Figure 4:
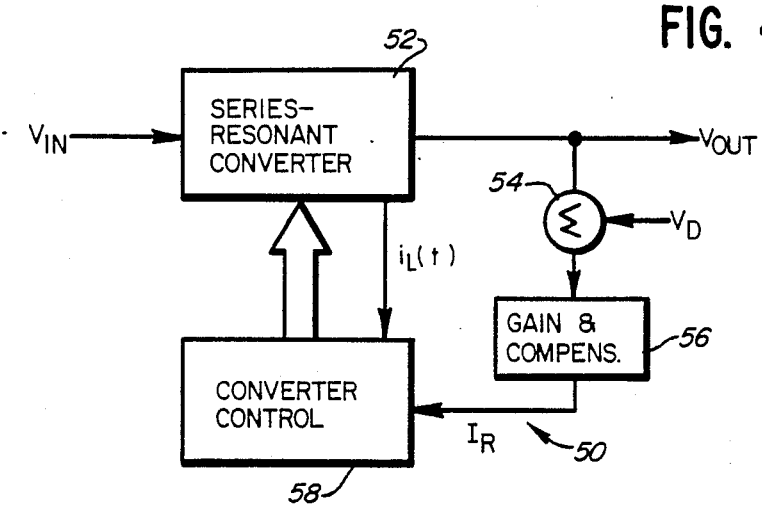
FIG. 4 is a block diagram of a series-resonant converter in construction with the converter control according to the present invention.

Referring now to FIG. 4, there is illustrated in block diagram form a converter control 50 according to the present invention which operates a resonant converter 52 in a current mode of operation. The converter 52 receives an input voltage $V_{IN}$ and develops an output voltage $V_{OUT}$ at a desired level. A voltage control loop includes a summing junction 54 which develops an error signal representing the deviation of the output voltage $V_{OUT}$ from a desired level $V_D$. A gain and compensation circuit 56 provides appropriate compensation and develops an output signal $I_R$ which represents the current requires to maintain the output voltage $V_{OUT}$ at the desired level. The signal $I_R$ is coupled to a converter control circuit 58 which also receives a signal $i_L(t)$ representing the resonant current in an inverter stage 59 (FIG. 5) of the converter 52. The converter control 58 develops signals for controlling the switches in the inverter stage, as noted more specifically below.

Figure 5:
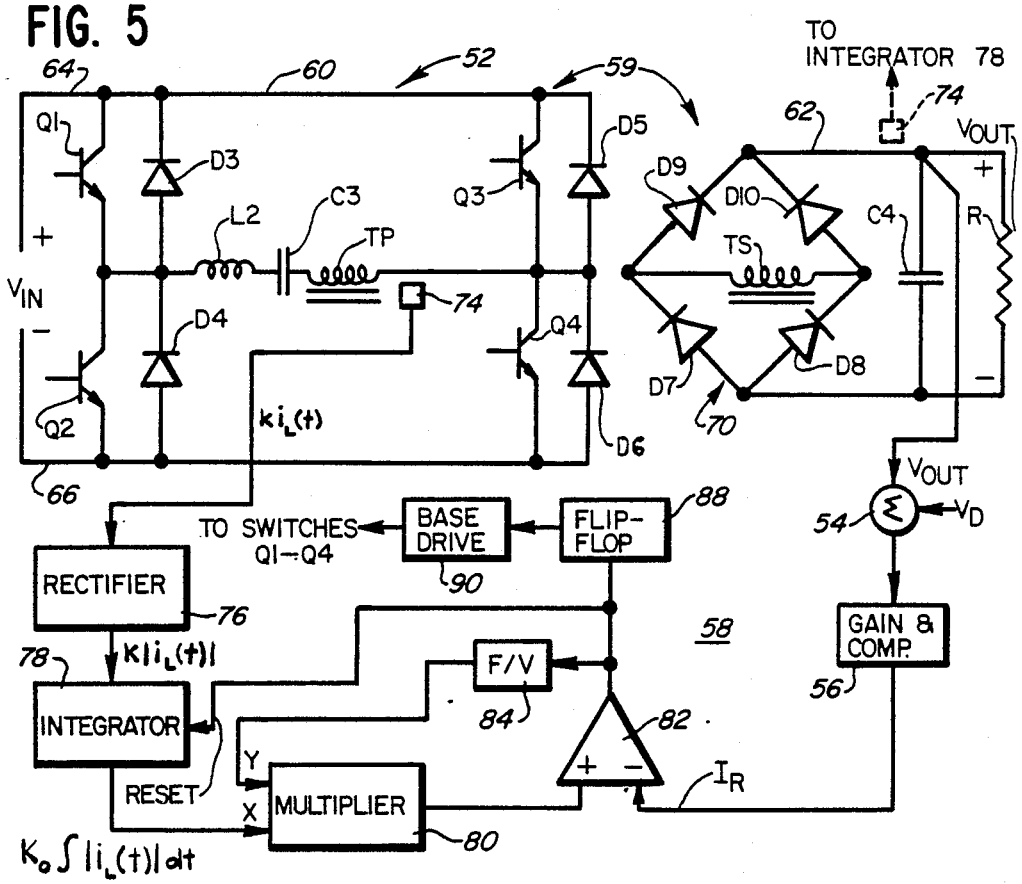
FIG. 5 is a combined schematic and block diagram of the converter and control shown in FIG. 4.

Referring now to FIG. 5, the inverter stage 59 develops intermediate AC power and includes a primary section 60 and a secondary section 62. The primary section 60 includes first and second power buses 64,66 which receive an input voltage $V_{IN}$. Coupled across the power buses 64,66 is a full-bridge inverter including power switches in the form of bipolar power transistors Q1–Q4 together with associated anti-parallel diodes D3–D6, respectively. A resonant circuit comprising an inductor L2, a capacitor C3 and a transformer primary winding TP are connected together in series and include a first end which is coupled to the junction between the transistors Q1 and Q2 and a second end which is coupled to the junction between the transistors Q3 and Q4.

The secondary section 62 includes a transformer secondary winding TS. The secondary winding TS is coupled across input terminals of a full-bridge rectifier 70 comprising diodes D7–D10. Output terminals of the rectifier 70 are coupled across an output capacitor C4 which develops an output voltage $V_{OUT}$. A load represented by a resistor R is coupled across the capacitor C4.

During operation of the converter 52, the transistors Q1,Q4 are operated together in alternating sequence with the transistors Q3,Q2 at a switching frequency $f_s$ so that first and second conductive paths are established through the primary section 60. The current through the resonant circuit comprising the inductor L2, the capacitor C3 and the transformer primary TP periodically reverses at the resonant frequency $f_r$ primarily determined by the combined impedance of the elements L2, C3 and TP. The switches are controlled so that the proper current is supplied to the load R to in turn maintain the voltage $V_{OUT}$ at the desired level.

Typically, the switching frequency $f_s$ of the switches Q1-Q4 is close to but not equal to the resonant frequency $f_r$ of the resonant circuit comprising the inductor L2, the capacitor C3 and the transformer primary TP.

It should be noted that the full-bridge configuration of the converter 52 including the transistors Q1-Q4 and diodes D3-D6 may be replaced by a half-bridge configuration similar to that shown in the above-identified Schwarz patent having two power switches or may be replaced by a single switch which is periodically operated to produce a resonant current in the resonant circuit.

The converter control 58 includes a current sensor 74 and a rectifier 76 which together develop a resonant current signal representing the current in the resonant circuit. This resonant current signal may be alternatively detected at the output of the full-bridge rectifier 70 as shown by the dotted line representation of the current sensor 74, if desired. In either event, this signal comprises a DC signal proportional to the magnitude of the resonant current. It should be noted that the current sensor 74 may be replaced by another type of sensor or other means which develops a signal representing some other parameter of the intermediate AC power.

The resonant current signal is coupled to an integrator 78 which integrates same to develop a signal equal to:

$$k_0 \int_0^T |i_L(t)|\, dt$$

where $k_0$ is a constant and $|i_L(t)|$ is the resonant current signal.

The integrator 78 includes a reset input which, upon receipt of a pulse at such input, causes the integrator 78 to reset to an initial value, typically zero.

The output of the integrator 78 is passed to a first input X of combining means comprising an analog multiplier circuit 80 which develops a combined or multiplied signal that is coupled to a noninverting input of a comparator 82. The comparator output is coupled to a frequency-to-voltage converter 84 which comprises means for developing a DC voltage representing the frequency of the comparator output. The output of the converter 84 is coupled to a second input Y of the multiplier 80.

The multiplier 80 multiplies the signals at its inputs to create a multiplied signal that is coupled to the comparator 82. The multiplier may be replaced by a different combining circuit or means which combines a signal representing the frequency of the comparator output with the integrator output, if desired. The output of the multiplier 80 represents the average current flowing into the output RC circuit comprising the capacitor C4 and the load R. The output of the multiplier 80 is represented by the value:

$$f_s \int_0^T |i_L(t)|\, dt$$

Since the switching frequency is the reciprocal of the period T, this value can be rewritten as follows:

$$1/T \int_0^T |i_L(t)|\, dt$$

An inverting input of the comparator 82 receives the signal $I_R$ developed by the gain and compensation circuit 56 and which represents the current required at the output of the converter 52 to maintain the output voltage $V_{OUT}$ at the desired level. The comparator 82 compares the multiplier output against the signal $I_R$ and develops a comparison signal which comprises a series of pulses which are coupled to a flip-flop 88. The flip-flop 88 develops control signals which are coupled to a base drive circuit 90 that in turn generates base drive signals at an appropriate level for operating the switches Q1-Q4.

The integrator is periodically reset by the comparator 82, as noted more specifically below.

The operation of the circuit of FIG. 5 will now be explained in conjunction with the waveforms shown in FIG. 6.

Figure 6:
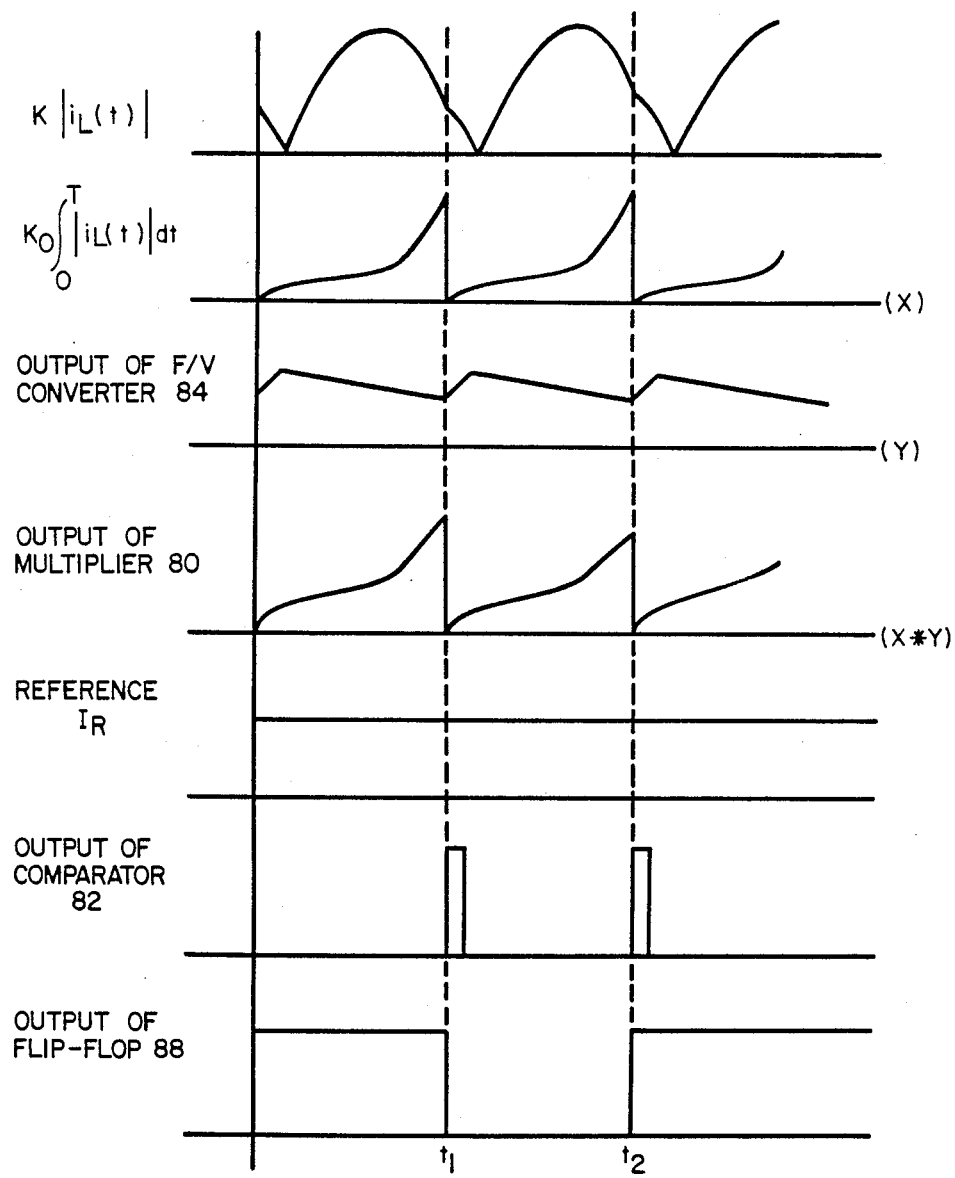
FIG. 6 is a series of waveform diagrams illustrating the operation of the control shown in FIG. 5.

The topmost three waveforms of FIG. 6 illustrate the output of the rectifier circuit 76 or the rectifier circuit 70, the output of the integrator 78 coupled to the first multiplier input X and the output of the frequency-to-voltage converter 84 coupled to the second input Y of the multiplier 80. As shown by the waveform diagrams, the signal Y is an asymmetrical triangular waveform wherein the output decreases until the integrator is reset, at which time the signal Y increases for a short period of time and begins to decrease again.

The combined or multiplied signal from the multiplier 80 is compared against the reference $I_R$ and when the level of these signals becomes equal, for example at time $t_1$, the comparator 82 develops a pulse of short duration which triggers the flip-flop 88 causing it to change state to a low value. Also, the pulse from the comparator 82 is applied to the reset input of the integrator 78 so that its output quickly drops to the initial value. Thereafter, the integrator output increases until the multiplier output again reaches the reference signal $I_R$ at a time $t_2$. At this time, the comparator 82 develops another pulse of short duration which toggles the flip-flop 88, causing it to revert to a high state output. This pulse also resets the integrator 78.

As is evident from the foregoing description, the multiplier controls the switching times of the switches Q1-Q4 and develops an output which is proportional to the integral of the intermediate AC power current and the output of the frequency-to-voltage converter 84. It should be noted that the frequency-to-voltage converter 84 includes a capacitor which causes the converter 84 to have a relatively slow response characteristic. This in turn prevents significant deviation in the conduction times of the switches during steady state operation, and hence static stability is improved.

It should be noted that the multiplier must have a fast response time so that it is capable of real time multiplication without significant delays.

Furthermore, the detection scheme for detecting when an integral reaches a particular threshold is improved over that disclosed in the above-referenced Schwarz patent since, in the instant invention, the threshold detector need only sense when the integrated current begins to rise above the reference level. This results in better dynamic stability as compared with the control disclosed in the above-identified Schwarz patent.

We claim:

1. A controller for a resonant DC/DC converter having at least one power switch which is controlled to develop intermediate AC power in a resonant circuit, comprising:

first means for developing a signal representing a parameter of the intermediate AC power;

an integrator having an input coupled to the first developing means for integrating the signal developed thereby;

a combining circuit having a first input coupled to an output of the integrator, a second input and an output at which is developed a combined signal;

a comparator coupled to the output of the combining circuit for comparing the combined signal against a reference signal; and second developing means coupled between the output of the comparator and a second input of the combining circuit for developing a feedback signal which represents the frequency of the comparator output and which is combined by the combining circuit with the output of the integrator to derive the combined signal;

whereby the comparator develops signals which are used to control the switch in the resonant converter.

2. The controller of claim 1, wherein the combining circuit comprises a multiplier.

3. The controller of claim 1, wherein the second developing means comprises a frequency-to-voltage converter.

4. The controller of claim 1, wherein the first developing means comprises a current sensor for sensing the current in the resonant circuit and a rectifier coupled to the current sensor.

5. The controller of claim 1, wherein the converter includes a rectifier for rectifying the intermediate AC power and wherein the first developing means comprises a current sensor for sensing the current developed by the rectifier.

6. A controller for controlling a resonant DC/DC converter which converts input DC power into intermediate AC power and converts the intermediate AC power into output DC power, the converter including at least two switches which are alternately operated to produce the intermediate AC power, comprising:

an integrator for integrating a first signal representing a parameter of the intermediate AC power;

a comparator having a first input, a second input which receives a reference signal and an output at which is developed a comparison signal;

means for developing a second signal representing the frequency of the comparison signal developed at the comparator output;

means coupled to the integrator and to the developing means for combining the integrated first signal with the second signal to develop a combined signal which is coupled to the first input of the comparator; and means for deriving signals from the comparison signal for operating the switches so that a parameter of the DC output power is maintained at a desired level.

7. The controller of claim 6, wherein the combining means comprises an analog multiplier.

8. The controller of claim 6, further including a current sensor which develops a signal representing the intermediate AC power current and a rectifier for rectifying the signal from the current sensor to derive the first signal.

9. The controller of claim 6, wherein the developing means comprises a frequency-to-voltage converter.

10. The controller of claim 6, wherein the deriving means includes a flip-flop coupled to the comparator output.

11. A controller for a resonant DC/DC converter having at least one power switch which is controlled to develop intermediate AC power in a resonant circuit, comprising:

means for developing a signal representing the current in the resonant circuit;

an integrator having an input coupled to the developing means for integrating the signal developed thereby;

a multiplier having a first input coupled to an output of the integrator and further having a second input and an output at which is developed a multiplied signal;

a comparator coupled to the output of the multiplier for comparing the multiplied signal at such output against a reference signal; and a frequency-to-voltage converter coupled between the output of the comparator and a second input of the multiplier for developing a feedback signal which is multiplied by the multiplier with the output of the integrator to derive the multiplied signal;

whereby the comparator develops signals which control the switch in the resonant converter.

12. The controller of claim 11, further including a flip-flop coupled between the comparator and the switch.

13. The controller of claim 11, wherein the reference signal is derived by a summing junction which sums a signal representing the actual output voltage of the converter with a signal representing a desired output voltage.

14. The controller of claim 11, wherein the integrator includes a reset input coupled to the comparator output wherein the integrator is reset to an initial value when the level of the multiplied signal reaches the level of the reference signal.

15. The controller of claim 11, wherein the developing means includes a current sensor for sensing the current in the resonant circuit and a rectifier coupled to the current sensor for rectifying the output of the current sensor.

16. A power converter, comprising:

a series-resonant DC/DC converter having an inverter stage which converts input DC power into intermediate AC power and a rectifier stage coupled to the inverter stage which converts the intermediate AC power into output DC power, the inverter stage including first and second pairs of switches and a resonant circuit coupled to the switches wherein the pairs are alternately operated so that the intermediate AC power is developed in the resonant circuit; and a controller for controlling the switches in the inverter stage including a current sensor for sensing the current in the resonant circuit, a rectifier coupled to the sensor for rectifying the sensed current, an integrator coupled to the rectifier for integrating the rectified sensed signal to derive an integrated signal, a multiplier having a first input which receives the integrated signal, a second input and an output at which is developed a multiplied signal, a comparator coupled to the multiplier output for comparing the multiplied signal against a reference signal to thereby develop a comparison signal, a frequency-to-voltage converter coupled between the comparator and the second input of the multiplier and a flip-flop coupled to the comparator for deriving switch control signals for the switches from the comparison signal so that the switches are operated to maintain the output DC power substantially at a desired voltage.

17. The power converter of claim 16, wherein the integrator includes a reset input which receives the comparison signal whereby the integrator is reset when the level of the multiplied signal reaches the level of the reference signal.

18. The power converter of claim 16, wherein the reference signal is derived by a summing junction which sums a signal representing the voltage of the output DC power with a signal representing the desired voltage.

* * * * *